Sept. 18, 1962 M. H. BURCKHARDT 3,054,307
TRANSMISSION INCLUDING A HYDRO-DYNAMIC TORQUE
CONVERTER, PARTICULARLY FOR MOTOR VEHICLES
Filed Jan. 7, 1957
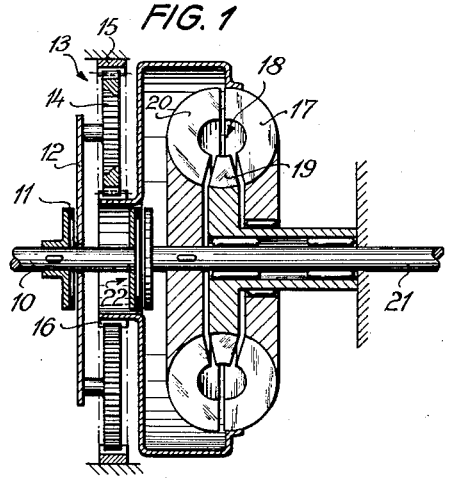
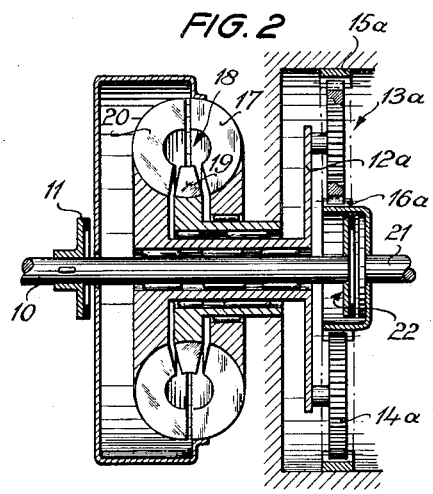
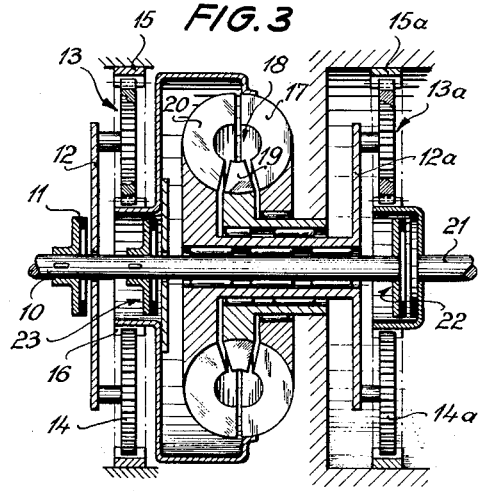
INVENTOR
MANFRED H. BURCKHARDT
BY Dieke and Craig
ATTORNEYS.

3,054,307
TRANSMISSION INCLUDING A HYDRO-DYNAMIC TORQUE CONVERTER, PARTICULARLY FOR MOTOR VEHICLES
Manfred H. Burckhardt, Stuttgart, Germany, assignor to Daimler-Benz Aktiengesellschaft, Stuttgart-Unterturkheim, Germany
Filed Jan. 7, 1957, Ser. No. 632,803
Claims priority, application Germany Jan. 7, 1956
9 Claims. (Cl. 74—688)

My invention relates to a transmission of the type including a hydro-dynamic torque converter such as primarily used in motor vehicles.

It is the object of my invention to provide an improved transmission of the type indicated in which the torque converter serves not only the purpose of starting the motor vehicle with one of the higher ratios of transmission, but also the purpose of accelerating the vehicle with one of the lower ratios of transmission.

More particularly, it is an object of my invention to provide an improved transmission of the type indicated which has a characteristic of the traction power which closely approaches the ideal traction hyperbola.

Further objects of my invention will appear from a detailed description of a number of various embodiments of my invention following hereinafter with reference to the drawings. It is to be understood, however, that the invention is in no way restricted to the details of such embodiments but is capable of numerous modifications within the scope of the appended claims. Also, it is to be understood that the phrases and terms used in such detailed description have been chosen for the purpose of explanation rather than that of restriction or limitation.

In the drawings:

FIG. 1 is a more or less diagrammatic longitudinal section taken through the novel transmission including a hydro-dynamic torque converter preceded by an epicyclic gearing, FIG. 2 is a sectional view similar to that of FIG. 1 of a transmission in which the hydro-dynamic torque converter precedes the epicyclic gearing, and FIG. 3 is an axial section of a transmission in which the hydro-dynamic torque converter is preceded by a first epicyclic transmission and precedes a second epicyclic transmission.

The embodiments of my invention illustrated in FIGS. 1 and 2 are transmissions comprising a driving shaft 10, a driven shaft 21, a disengageable clutch 22 connecting such shafts, a hydro-dynamic torque converter 18 including an impeller rotor 17 coordinated to the driving shaft 10 to be driven thereby and a turbine rotor 20 coordinated to the driven shaft 21 to drive same, the rotors 17 and 20 being coaxially disposed with respect to each other and to the shafts 10 and 21, and a gearing 13, or 13a respectively, connecting one of the rotors 17, 20 with its associated shaft. In the embodiment shown in FIG. 1 it is the impeller rotor 17 which is connected with its associated shaft 10 by the gearing 13, whereas in the embodiment shown in FIG. 2 it is the turbine rotor 20 which is connected with its associated shaft 21 by the transmission 13a. In either case the ratio of transmission of the gearing 13, or 13a respectively, is so chosen that the impeller rotor 17 will overtake the turbine rotor 20 when the clutch 22 is engaged.

The driving shaft 10 is driven by the engine, for instance the engine of a motor vehicle, and, through the intermediary of a disengageable clutch 11 which may be a friction clutch, is connected with a member 12 rotatably mounted on the shaft 10 and supporting a plurality of planetary gears 14 which are meshing with a stationary internal gear 15 fixed to the housing (not shown) of the transmission and at the same time engage a sun gear 16 fixed to an extension of the impeller rotor 17 of the torque converter 18. If desired, the internal gear 15 may be mounted for rotation and may be controlled by a brake for optionally arresting the internal gear whenever power is to be transmitted by the hydro-dynamic torque converter 18. In this event, the supporting member 12 may be fixed to the shaft 10, the brake constituting, in effect, a second disengageable clutch inserted between the rotor 17 and the associated shaft 10 and operative when disengaged to disable the torque converter 18 to transfer power between the shafts 10 and 21.

Moreover the torque converter includes a supporting disk carrying a set of guide vanes 19. This supporting disk may be either fixed to the housing as diagrammatically shown in FIGS. 1 and 2 or, alternatively, may be mounted for rotation about the common axis of shaft 10 and 21 and locked against rotation in one direction by a free-wheeling mechanism. The turbine rotor 20 is fixed to the shaft 21.

The operation is as follows:

Let it be assumed that the clutch 22 is disengaged and that the clutch 11 is engaged causing power to be transmitted from the driving shaft 10 to the driven shaft 21 exclusively via the train of motion transmitting elements composed of clutch 11, member 12, planetary gears 14, sun gear 16, impeller rotor 17 and turbine rotor 20. When the vehicle is at rest and the engine is started and accelerated, the impeller rotor 17 will overtake the turbine rotor 20 which first is at rest and by the liquid circulating through the vanes of the two rotors 17 and 20 and through the vanes 19 is gradually accelerated without being able, however, to catch up with the impeller rotor 17. In other words, a slippage occurs between the two rotors 17 and 20. The gearing 13, however, constitutes an overdrive gearing causing the impeller 17 to rotate at a higher speed than the driving shaft 10. Therefore, the turbine rotor 20 although rotating at a speed lower than that of the impeller rotor 17 will nevertheless gradually reach the rotary speed of the driving shaft 10. When that happens, the clutch 22 is engaged to permit the direct transfer of power between the shafts 10 and 21 and the clutch 11 is disengaged to disable the torque converter 18 to transfer power between the shafts 10 and 21.

In prior transmissions in which the impeller rotor was connected with the driving shaft 10 for common rotation, the rotary speed of the driven shaft connected for common rotation with the turbine rotor always remained lower than that of the driving shaft. In my novel transmission, however, in which the impeller 17 is preceded by the overdrive gearing 13, the impeller rotor tends to accelerate the turbine rotor and the driven shaft connected therewith up to the rotary speed of the driving shaft or beyond the same in spite of the slippage between the rotors of the converter 18. Therefore, the shafts 10 and 21 may be directly connected by the by-pass clutch 22 at a time, when the two shafts 10 and 21 have equal speeds so that no shock will occur coincidentally to the engagement of the clutch 22, although the slippage characteristic of hydro-dynamic torque converters occurs between the impeller rotor 17 and the turbine rotor 20, such slippage enabling the torque converter to transfer the desired torque. Because of the absence of any shocks coincidental to the engagement of the clutch 22, the same may be given comparatively small dimensions. The clutch 11 too may be made comparatively simple and small because it need not transfer any substantial torque in the act of being engaged and therefore is not subject to considerable wear.

The second disengageable clutch 11 may be disposed between the sun gear 16 and the impeller rotor 17 or between the turbine rotor 20 and the driven shaft 21 and, in this event, the supporting member 12 will be fixed to the driving shaft 10.

The driven shaft 21 is geared to the driven wheels of the vehicle by a conventional speed-change transmission adapted to be set to anyone of a plurality of ratios of transmission. During any such setting operation, the converter can be employed to bridge the ratio-changing operation. This involves the advantage that the converter which necessarily has a comparatively poor efficiency will be operative to transfer power only at a time and always at a time when the converter is really required. This will ensure a favorable fuel consumption.

In the embodiment illustrated in FIG. 2 the second disengageable clutch 11 is interposed between the driving shaft 10 and the extension of the impeller rotor 17 and the epicyclic gearing 13a constituting an overdrive gearing is preceded by the torque converter 18. More particularly, the turbine rotor 20 is rigidly connected with a hollow shaft surrounding the driving shaft 10 and extending through the disk carrying vanes 19, its end projecting therefrom and being rigidly connected with a disk-shaped support 12a carrying planetary gears 13a which are in constant mesh with both, an internally toothed annular gear 15a fixed to the housing and with a sun gear 16a having a hub fixed to the driven shaft 21.

Hence it will appear that in the embodiment illustrated in FIG. 2 the impeller rotor 17 is directly connected with the driving shaft 10 by the clutch 11, whereas the turbine rotor 20 is connected with the coordinated driven shaft 21 through the intermediary of the overdrive gearing 13a. The internally toothed annular gear 15a may be mounted for rotation controlled by a brake as described hereinabove with reference to the gearing 13.

The operation of the embodiment shown in FIG. 2 is in principle similar to that of the embodiment shown in FIG. 1. Because of the slippage in the torque converter 18 the support 12a of the planetary gears will rotate at a lower speed than the driving shaft 10. Owing to the overdrive gearing, however, the driven shaft 21 will rotate at a higher speed than the turbine rotor 20. Therefore, the sun gear 16a will overtake the driving shaft 10 enabling the clutch 22 to be engaged after the shafts 10 and 21 have been synchronized.

Whether the embodiment illustrated in FIG. 1 or the embodiment illustrated in FIG. 2 should be preferred, depends essentially on the power-transferring capacity of the torque converter with respect to the power of the engine. Where the operation of the impeller rotor at a certain speed requires a torque produced by the engine at the same speed, the embodiment shown in FIG. 2 should be preferred. Where the engine, however, is capable of producing a higher torque than that required to drive the impeller rotor 17 at a certain speed, the embodiment shown in FIG. 1 should be preferred in order to ensure that the torque converter be capable of transferring the full engine power. The possibility of electing one or the other of the two embodiments to meet the exigencies of any particular case is of importance where the engine may be optionally equipped with a compressor. In this event the torque converter will be so dimensioned that when used in the manner shown in FIG. 2, it is capable of transferring the power of the bare engine, whereas when arranged in the manner shown in FIG. 1 it is capable of transferring the power of the engine equipped with the compressor.

The embodiment illustrated in FIG. 3 may be regarded as a combination of the arrangements shown in FIGS. 1 and 2, the torque converter 18 being provided with both, the overdrive gearing 13 preceding the converter and the overdrive gearing 13a preceded by the converter. In this case too the same effect in principle can be attained as with the embodiments described hereinabove. Preferably the ratios of transmission of the two planetary gearings 13 and 13a are different. This has the advantage that the characteristic of the torque converter may be conformed in a particularly suitable manner to that of the engine. Additionally a further clutch 23 may be provided which by-passes the planetary gearing 13 and is adapted to directly connect the driving shaft 10 with the impeller rotor 17 of the converter.

When first the clutches 22 and 23 are disengaged and the clutch 11 is engaged, the impeller rotor 17 will rotate at an increased speed, the point of power transfer by the converter being shifted on the graph representing the transmission ratios towards the low speed end. If desired, a noiseless starting of the vehicle may be attained in this manner. With clutch 11 engaged and clutches 22 and 23 disengaged, there will be a speed difference between the driving shaft 10 and the impeller rotor 17 as well as between the turbine rotor 20 and the driven shaft 21, these speed differences being achieved by the gearings 13 and 13a, respectively. When the driver disengages clutch 11 and at the same time engages clutch 23, the speed of the impeller rotor 17 will be slowed down compared with the preceding operation so as to revolve at the same speed as the driving shaft 10. As a result, the point of initial power transfer by the converter will be shifted in the graph towards the high speed end. As a result, the torque converter assists in increasing the traction power when the transmission is set to the lower ratios of transmission, for intance, the second, third or fourth ratio. With the aid of the gearing 13a preceded by the converter 18 the position of the traction characteristic may be increased in proportion so that the by-pass clutch 22 may be engaged in a smooth manner and that a very low fuel consumption may be attained.

From the above explanations it will appear that my novel transmission affords a possibility of using the converter not only for the purpose of starting the vehicle with the higher ratios of transmission but also for the purpose of accelerating the vehicle when the transmission is set to any one of its lower ratios. In this manner the vehicle, particularly a truck, is capable of an operation having a traction characteristic approaching the ideal traction hyperbola compared with the stepwise variable ratios of the conventional transmissions.

Transmissions equipped with a torque converter and with a by-pass clutch and transmissions in which the torque converter is preceded by a gearing for the purpose of conforming the converter to the engine torque are known in the prior art. In such prior art, however, the converter is operated as a matter of principle with the higher ratios of transmission only, for instance with the transmission being set to the first gear or the second gear. Since the converter is dimensioned accordingly, it is of limited utility only, because its range of operation with the lower ratios of transmission is completely covered by the next lower ratio of transmission. Using the converter in the third gear ratio for instance offers no advantage compared with an operation of the transmission in the third gear ratio without the converter since in this operation the range obtainable with the aid of the converter may be covered just as well with the second gear ratio alone without any losses and with a higher efficiency. The relatively poor efficiency of a torque converter when operated near the so-called clutching point (about 85–90 percent) has led to the practice of by-passing the converter by a mechanical clutch as soon as the speed of travel exceeds a predetermined limit.

As is well known any torque converter when transferring a predetermined torque, has a slippage which is the cause of the low efficiency. When the torque converter is by-passed by engagement of a by-pass clutch, such clutch in the act of being engaged is subjected to the same slippage. In order to be able to transfer the full engine torque in spite of the comparatively large slippage which may amount to 25 percent, the clutch must have large dimensions. In fact, the clutch must meet substantially the same requirements as any conventional starting clutch.

In my novel transmission, however, the clutch 22 will be not subject to any slippage in the act of being engaged and therefore will act in a much smoother manner when by-passing the torque converter.

Moreover my invention relates to a method of operating a transmission of the type including a torque converter and a by-pass clutch in such a manner that the torque converter is used for the purpose of acceleration only, the by-pass clutch being engaged when the clutch members rotate at a predetermined ratio of rotation. Preferably the by-pass clutch is engaged when the clutch members are synchronized. The clutches may be controlled automatically in dependence on the rotary speed, for instance in an electrical manner by means of a centrifugal governor. If desired, means may be provided whereby the automatic engagement of the clutches may be eliminated.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a transmission the combination comprising a driving shaft, a driven shaft, an engageable clutch means for directly connecting said shafts, a hydro-dynamic torque converter including an impeller rotor and a turbine rotor, both rotors being co-axially disposed, a first overdrive gearing operatively connecting said driving shaft with said impeller rotor causing same to rotate at a higher speed than said driving shaft, a second overdrive gearing operatively connecting said turbine rotor with said driven shaft causing the latter to rotate at a higher speed than said turbine rotor.

2. The combination claimed in claim 2 further comprising a disengageable clutch inserted between one of said rotors and the associated shaft and being operative when disengaged to disable said torque converter to transfer power between said shafts.

3. The combination claimed in claim 2 in which said gearing is an epicyclic gearing.

4. A transmission unit comprising input means, output means, a hydrodynamic transmission device, means constituting two motion transmitting trains for selectively and alternately connecting said input means with said output means, one of said motion-transmitting trains including said hydrodynamic device, epicyclic gear means having a predetermined gear ratio and selectively engageable clutch means connecting said input means and said epicyclic gear means for completing an operative connection through said one train between said input means and said output means, the other of said motion-transmitting trains including further clutch means for directly connecting said input means with said output means in by-passing relationship with respect to said hydrodynamic device and said epicyclic gear means, said epicyclic gear means including planet gear means for receiving transmitted motion from said input means and sun gear means for transmitting the received motion from said planet gear means to said output means through said hydrodynamic device when said selectively engageable clutch means is engaged, said transmission ratio of the epicyclic gear means being so selected that said output means rotates at essentially the same speed as said input means while said selectively engageable clutch means is engaged and while said hydrodynamic device is operating with a predetermined slippage, said epicyclic gear means constituting over-drive gearing and being connected ahead of said hydrodynamic transmission device in said one motion-transmitting train.

5. A transmission unit comprising input means, output means, a hydrodynamic transmission device, means constituting two motion-transmitting trains for selectively and alternately connecting said input means with said output means, one of said motion-transmitting trains including said hydrodynamic device, a first gearing operatively connected between said hydrodynamic device and said input means and a second gearing operatively connected between said hydrodynamic device and said output means, said hydrodynamic device having an impeller rotor and a turbine rotor for transmitting motion from said first gearing to said second gearing, said first gearing constituting an overdrive gearing providing a rotational speed differential between said input means and said impeller rotor, said second gearing providing a rotational speed differential between said turbine rotor and said output means, the other of said motion-transmitting trains including clutch means for directly connecting said input means with said output means in by-passing relationship with respect to said one motion-transmitting train, each of said gearings having a predetermined ratio so selected that said output means rotates at essentially the same speed as said input means when said one motion-transmitting train is active with said hydrodynamic device operating at a predetermined slippage.

6. In a transmission the combination comprising a driving shaft, a driven shaft, said shafts having adjacent end portions, clutch means on said adjacent end portions engageable to directly connect said shafts, a hydro-dynamic torque converter including an impeller rotor and a turbine rotor, means including a speed increasing gearing only for operatively connecting said driving shaft to said impeller rotor to drive the latter, said rotors being coaxially disposed, means for connecting said turbine rotor to said driven shaft to drive the latter, both said connecting means providing a torque transmission path through said gearing and said torque converter in by-passing relationship with respect to said clutch means when the latter is disengaged, said gearing having a ratio of transmission such that said impeller rotor will operate at a speed higher than both the speed of said driving shaft and the speed of said turbine rotor to facilitate engagement of said clutch means when said shafts are rotating at substantially identical speeds.

7. The combination according to claim 2, further including disengageable clutch means connecting said gearing with said driving shaft.

8. The combination according to claim 2, wherein the connecting means between said turbine rotor and said driven shaft includes overdrive gearing means for driving said driven shaft at a higher speed than said turbine rotor.

9. In a transmission the combination comprising a driving shaft, a driven shaft, clutch means engageable to directly connect said shafts, a hydro-dynamic torque converter including an impeller rotor and a turbine rotor, said rotors being coaxially disposed, means operatively connecting said impeller rotor exclusively with said driving shaft including disengageable clutch means and gearing means, said gearing means constituting over-drive means, means for operatively connecting said turbine rotor to said driven shaft, said torque converter and said gearing means being operable through both said connecting means to transfer power between said shafts when said clutch means is disengaged, the ratio of transmission of said gearing means being so chosen that, when the clutch means is disengaged, the relative rotary speed of said shafts will become substantially zero whereupon the clutch means may be engaged with minimum slippage.

(References on following page)

References Cited in the file of this patent

UNITED STATES PATENTS

| | | |
|---|---|---|
| 2,135,282 | Fottinger | Nov. 1, 1938 |
| 2,147,528 | Fottinger | Feb. 14, 1939 |
| 2,281,077 | Pollard | Apr. 28, 1942 |
| 2,283,759 | Pollard | May 19, 1942 |
| 2,301,451 | Pollard | Nov. 10, 1942 |
| 2,324,733 | Smirl | July 20, 1943 |
| 2,325,876 | Pollard | Aug. 3, 1943 |
| 2,351,213 | James | June 13, 1944 |

FOREIGN PATENTS

| | | |
|---|---|---|
| 509,763 | Great Britain | Jan. 17, 1939 |